June 13, 1933. F. A. MITCHELL 1,913,558
AUTOMATIC STOP
Filed May 2, 1930 5 Sheets-Sheet 1

INVENTOR
FRANK ALLEN MITCHELL
BY *John A Hanrahan*
ATTORNEY

INVENTOR
FRANK ALLEN MITCHELL.
ATTORNEY

June 13, 1933.  F. A. MITCHELL  1,913,558
AUTOMATIC STOP
Filed May 2, 1930    5 Sheets-Sheet 3

INVENTOR
FRANK ALLEN MITCHELL.
BY
ATTORNEY

INVENTOR
FRANK ALLEN MITCHELL.
ATTORNEY

Patented June 13, 1933

1,913,558

UNITED STATES PATENT OFFICE

FRANK ALLEN MITCHELL, OF LONDON, ENGLAND, ASSIGNOR TO COLUMBIA PHONOGRAPH COMPANY, INC., OF BRIDGEPORT, CONNECTICUT, A CORPORATION OF NEW YORK

AUTOMATIC STOP

Application filed May 2, 1930, Serial No. 449,204, and in Great Britain May 27, 1929.

This invention relates to automatic control mechanism for gramophones and the like, and has more particular reference to that type of control apparatus adapted to be actuated by the variation of movement of the reproducer (for example, a sound box or electrical pickup) after the reproduction is finished.

The object of the invention is to provide an improved and simplified form of control adapted to operate mechanisms for stopping, repeating or changing records associated with gramophones or the like.

The invention consists in an automatic control device for gramophones or the like in which the controlling mechanism is put into operation by means dependent on characteristics of the record and actuates upon any change in the said characteristics during or after reproduction.

The invention further consists of an automatic control device for gramophones or the like of this type in which the characteristic of the record employed consists in the lateral spacing of adjacent turns of the groove of a modern grooved record.

The invention further consists in an automatic control device for gramophones and the like comprising tone arm or pickup arm and adapted to actuate the control mechanism when the rate of travel of the arm and/or the said member associated with it is varied.

The invention further consists in an automatic control device as above in which the member is moved by the tone arm, its rate of movement being under the control of the record groove spacing. The said member may in turn co-operate with a part driven by the turntable motor independently of the record groove.

The invention further consists in an automatic control device comprising a member movable through a predetermined distance through the medium of the tone arm in one direction, said member being intermittently replaced in the opposite direction and arranged so that when the said member is moved more than a predetermined amount it functions to operate a control device.

The invention further consists in other novel features, the nature of which will be disclosed with reference to the following description and drawings in which:—

Figure 1:
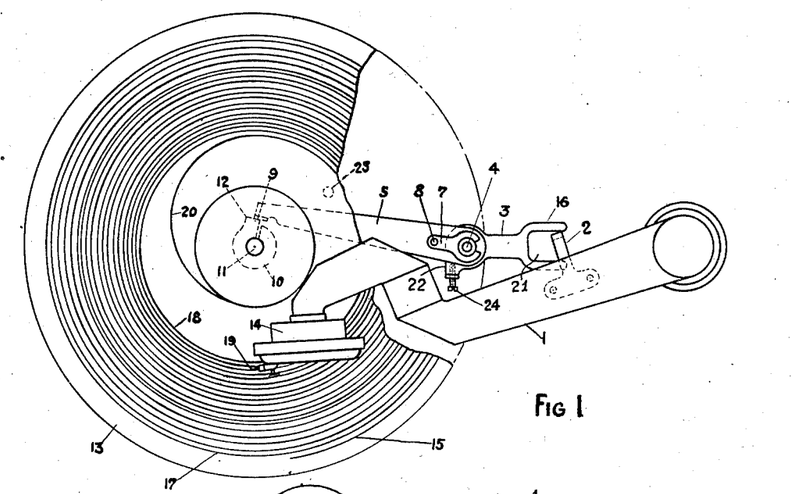
Figure 1 is a plan of one convenient form of the invention.
Figures 2, 3, 4, 5, 6, 7:
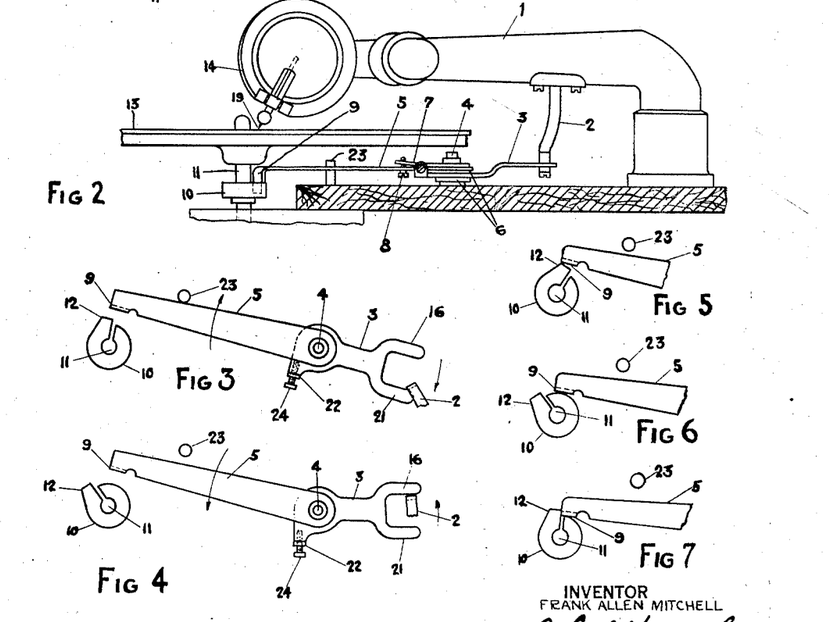
Fig. 2 is a side elevation of Fig. 1.
Figs. 3 to 7 show various stages in the operation of the control device shown in Figs. 1 and 2.

In one convenient form of the invention the construction of which is shown in Figs. 1 and 2 I attach to the underside of the tone arm 1 a depending lug 2 adapted to engage a lever 3 pivoted at 4 on a base plate or the motor board of the instrument.

The lever 3 is frictionally attached to the lever 5 by means of the friction discs 6 interposed between the levers and adapted to be adjusted by the spring clip 7 and screw 8 so that when the lever 3 is moved it will also move the lever 5, provided no resistance is offered to the movement of the lever 5.

The turned down end 9 of the lever 5 is adapted to operate in conjunction with a cam member 10 rotated by or with the turntable shaft 11 of the motor, said cam having a projection 12 thereon adapted to engage and push the end 9 of the lever 5 to one side at regular intervals, for example, once every revolution of the turntable.

The action of the cam 10 on the lever 5 will be more fully understood by reference to Figs. 3 to 7. A record disc 13 is rotated (in a clockwise sense in the example shown) by or with the turntable so that the soundbox 14 and tone arm 1 (Fig. 1) are fed inwards by the groove 15 in the usual way. The lug 2 on the tone arm 1 in turn pushes the finger 16 and lever 3 inwards through a definite distance for each revolution of the record 13. The lever 3 in turn moves lever 5 around the pivot 4 owing to its friction connection therewith at 6 until the end 9 reaches the position shown in Fig. 4, when further rotation of the turntable will cause the projection 12 on the cam to rub on the end 9 as in Fig. 5, so that the lever 5 is returned outwards to its original position. Such movement can occur without causing any return movement of the tone arm 1, by reason of the frictional connection 6 between the arms 3 and 5 which permits a slight relative slip.

If the lever 5 is again moved a short distance (for example, a distance proportional to the distance between consecutive turns 15 and 17 (Fig. 1) of the sound groove traversed by the arm 1 in a single revolution of the record) it again engages the projection 12 on the cam 10 as shown in Figs. 4, 1 and 5 successively and is again returned to its original position. This action is repeated until the soundbox 14 reaches the finishing sound groove 18 on the record. When however, the soundbox needle 19 runs inwards in the groove 20 (Fig. 1) so that the levers 3 and 5 are moved through a distance greater than the usual predetermined distance (i. e. a distance proportional to the interval between sound grooves), the lever 5 engages and arrests the catch shaped projection 12 on the cam 10 (as shown in Figs. 6 and 7). In the example shown this cam 10 is split to form a friction fit on the turntable shaft 11 and is adapted thereby to stop rotation of the turntable and motor by braking the shaft.

When it is desired to re-start the motor it is only necessary to move the sound box 14 and tone arm 1 outwards from the center of the record, when the lug 2 engages the finger 21 (as shown in Fig. 3) and the projection 22 forces the lever 5 out of engagement with the cam 10 and allows the motor to run, at the same time resetting the levers 3 and 5 to play another record.

It will be seen that the maximum distance the sound box 14 can be moved outwards is limited by the levers 21, 22, 5 and a stop pin 23, the exact location being determined by adjustment of a screw 24 in the projection 22 (Figs. 3 and 4).

The screw 24 may and preferably should be so adjusted and the two fingers 16 and 22 (Fig. 3) so spaced apart that the lug 2 on the tone arm does not engage the finger 16 until the reproducing needle 19 is at a position within a few inches from the finishing groove 18 on the record.

Figure 8:
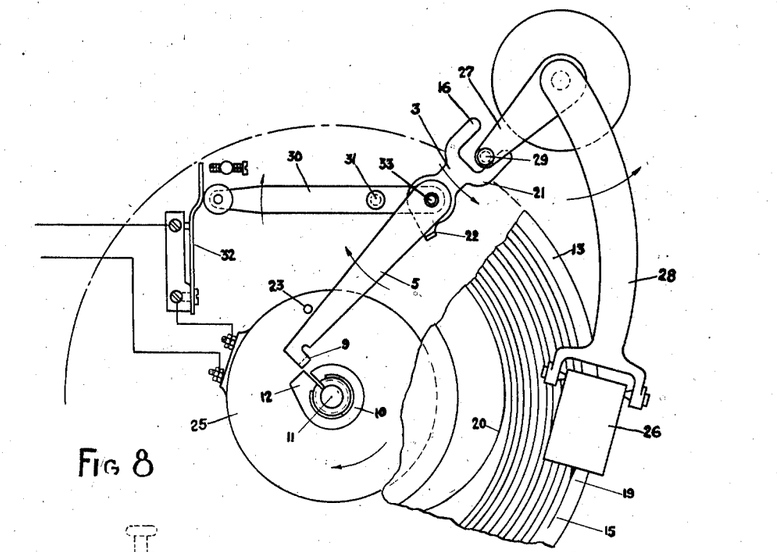
Figs. 8 and 9 show the device applied to an electric motor.
Figures 9, 10:
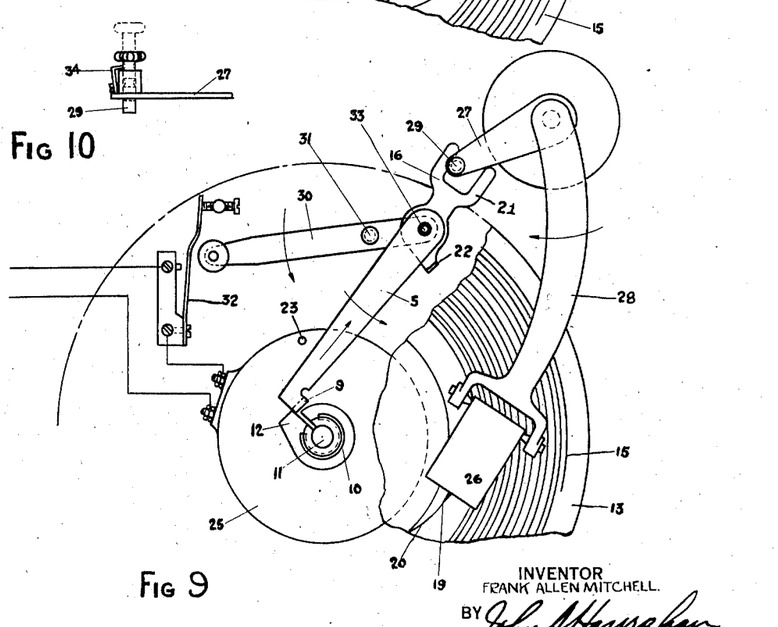
Fig. 10 is a detail part.

In the construction shown in Figs. 8 and 9 a similar action is used as in the previous example, but applied to an electric motor 25 and electric reproducer or pickup 26.

The lug 27 is attached to be moved by the arm 28 so that the lug extension 29 engages the lever 3 and operates lever 5 as described above.

Fig. 8 shows the mechanism in the record commencing position. The pickup 26 and arm 28 are moved outwards so that the extension 29 pushes finger 21 and moves lever 5 in the direction of the arrow. Lever 5 thus reacts on the stop pin 23 to cause a second lever 30 to move in the direction of the arrow about its pivot 31, thus closing the electric switch 32 and permitting current to drive the motor 25.

The pickup needle 19 is placed in the record groove 15 and after a few revolutions the projection 29 is moved into contact with the finger 16 and eventually causes the end 9 to rotate about a pivot 33 and contact with the cam extension 12, by which it is intermittently returned to its normal position. This continues until the pickup reaches the position shown in Fig. 9, when the groove 20 causes the needle 19 and arm 28 to rotate inwards by an increased amount for one revolution of the turntable shaft 11 and thereby moves the end 9 into engagement with the catch projection 12 (Fig. 9). In this position the rotating cam applies a force along the length of the lever 5 in the direction of the arrow and this in turn pushes the pivot pin 33. In the present modification the pin 33 acts only as a connection between levers 3, 5 and 30 and is not pivoted to the base board. The lever 30 is therefore caused to move around its fixed pivot 31, and releases the electrical contact 32, to stop the electric motor 25.

Instead of an electric switch 32, a mechanical brake could be applied to the turntable by the lever 30 or a control device operated in any other desired manner.

For example, the electric switch 32 may serve to switch off the amplifier associated with the pickup 26.

When it is desired to put the auto stop or control mechanism out of action it is only necessary to lift the pin 29 (as shown dotted in Fig. 10 where it is held by the spring 34) free from the fingers 16 and 21 on the lever 3, Figs. 8 and 9.

One method of applying the beforementioned apparatus to control a record repeating device is shown in Figs. 11 to 14. The pickup 26, the arm 28, the lug 27, the levers 3 and 5 and the cam 10 all operate as before.

When the instrument is started the end 9 engages on a catch 34 on the switch lever 35 and keeps apart the contact terminals at 10

36. The record plays in the usual way, so that the projection 12 keeps the end 9 on the catch 34 until the needle reaches the "fast" spiral groove at the end of the record. (This finishing or operating groove 20 (Fig. 1) may be of any length or it may be an eccentric groove or of any other formation calculated to subject the needle to an abnormal rate of movement). The end 9 then leaves the switch 35 and permits the terminals at 36 to come into contact.

Figures 11, 12:
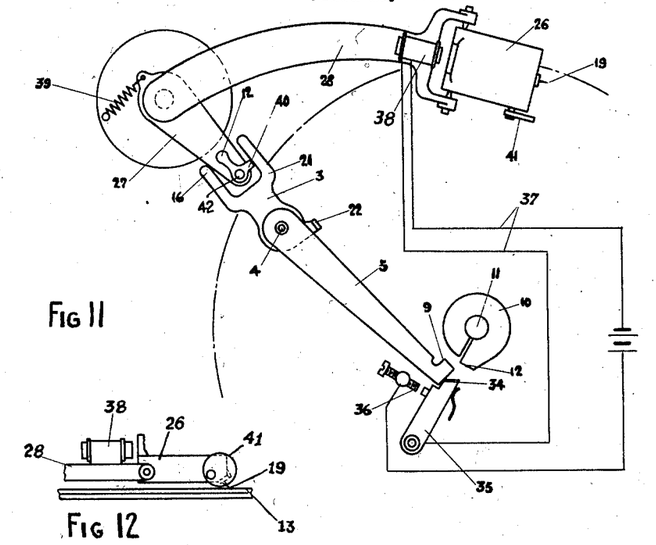
Figs. 11 to 14 show the device applied to record repeating mechanism.
Figures 13, 14:
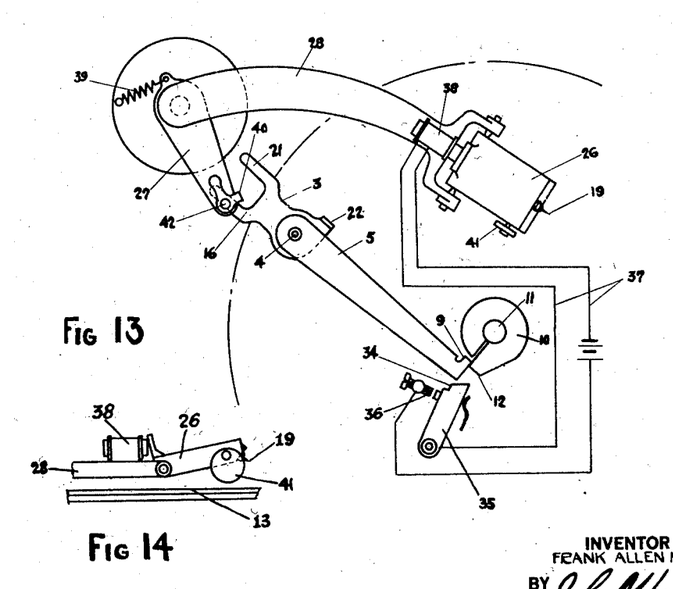

Electric current then flows through the wires 37 and actuates the magnet 38 so that it lifts the pickup 26 from the normal playing position shown in Figs. 11 and 12 into the elevated position shown in Figs. 13 and 14. As soon as the needle 19 leaves the record groove the spring 39 is able to pull the arm 28 outwards from the position shown in Fig. 13 to the position near the beginning of the record shown in Fig. 11. In this position a pin 40 strikes the finger 21 on the lever 3 and thereby moves the lever 5 and end 9 out of engagement with the cam projection 12 to open the circuit between the terminals 36. This cuts off the electric current from the magnet 38 and allows the pickup 26 to fall until an eccentric 41 strikes the record surface. The eccentric 41 then rotates from the position shown in Fig. 14 into that shown in Fig. 12 to lower gently the pickup needle 19 into contact with the groove of the record being played.

The record is then replayed and the sequence of operations repeated as often as desired.

To accommodate the replaying of records of different diameters, which necessitates a different angular replacing movement of the arm 28, the pin 40 is adapted to be manually adjusted by rotation about a pivot 42 on the lug 27.

Thus when it is desired to lower the pickup needle 19 at the commencement of a 12" record instead of on a 10" record, for example, the pin 40 should be turned about its pivot 42 on the lug 27 which will then have to move through a bigger angle before the circuit 37 is broken.

The lever 5 or other moving part may actuate mechanical record repeating or record changing apparatus: for example, when lever 5 engages the cam 10, power from the motor may be applied to lift mechanically and return the reproducer when repeating or changing a record; or, if desired, the control device may simply actuate to start repeating, changing or like apparatus which has been pre-set or is operated by mechanism other than the said turntable motor. One convenient form of such apparatus is shown in British Patent No. 191,413 for example.

Figure 15:
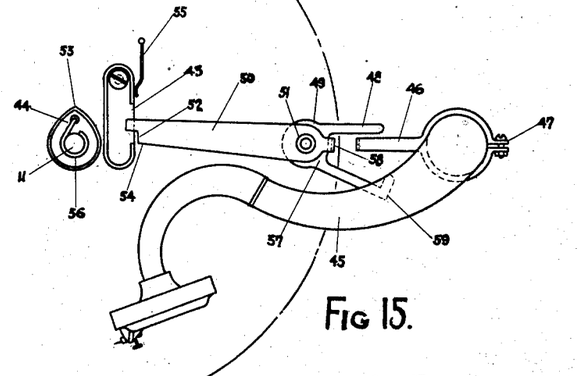
Figs. 15 to 17 show a modification comprising another convenient form of control mechanism embodying the invention.
Figure 16:
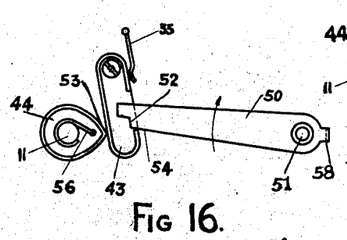
Figure 17:
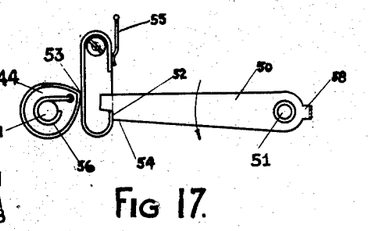

Figs. 15 to 17 illustrate another convenient form of the invention in which a rocking lever 43 is provided between the lever 50 and a cam 44 for the purpose of maintaining a constant contact between the moving part and the rotating cam 44, as distinct from the striking action shown in the previous examples.

While playing a record the tone arm 45 and lug 46 (which may be adjustable relative to the arm 45 by use of the clamp 47) move the finger 48 as before described in connection with finger 16. The lever 49 moves the lever 50 by means of the friction joint 51 so that the end 52 is in the position shown in Fig. 15 once during each revolution of the record sound groove. The continued rotation of the cam 44 and raised portion 53 pushes the lever 43 into the position shown in Fig. 16, when the edge 54 engages the end 52 and returns the lever to its normal position, from which it is again moved during the next revolution of the sound groove; the spring 55 keeps the rocker 43 in contact with the cam 44 all the time.

When the reproducer reaches the groove of increased pitch on the record the lever 50 is moved thereby into the position shown in Fig. 17 where the end of 54 jams against the lever stop 52 and prevents further rotation of the cam, which is in friction contact with the turntable shaft 11 by a spring clip 56 and thereby stops rotation of the turntable and record.

The control device is reset and the turntable released when the arm 45 is moved outwards sufficient for the lug 46 to engage the finger 57 and move a lever 58 and lever 50 and end 52 out of engagement with the rocker 43. A limiting stop 59 prevents the tone arm being moved outwards too far.

Figures 18, 19, 20:
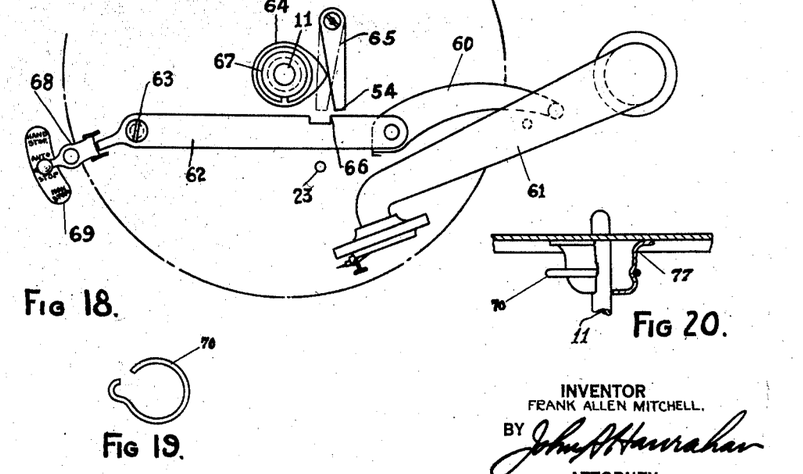
Fig. 18 is yet another form of the invention.
Figs. 19 and 20 are details of an alternative cam fitting applicable to the invention.

Fig. 18 shows one form of the invention embodying several modifications of the control mechanism. A lever 60 is adapted to be reset by hand instead of by outward movement of the tone arm 61. The lever 62 corresponding to lever 5 of the previous forms is pivoted on the base of the instrument at 63 instead of at the friction joint between 60 and 62 as in the previous examples. The cam 64 and rocker 65 function to operate with stop 66 during the inward movement of the tone arm 61 in a similar manner to that shown in Figs. 15 to 17. The cam 64 is in friction engagement with the shaft 11 by means of the spring washer 67.

The control device can be actuated by hand by movement of a lever 68, over the dial 69 to the "Hand stop" position or by moving the lever 60; or the control device can be put out of action by moving the lever 68 to the "Non-stop" position.

A simple form of cam similar to cams 10 and 44 of the previous forms is shown in Figs. 19 and 20 and consists in a coil of spring wire 70 adapted to grip by friction the turntable boss 71.

Figure 21:
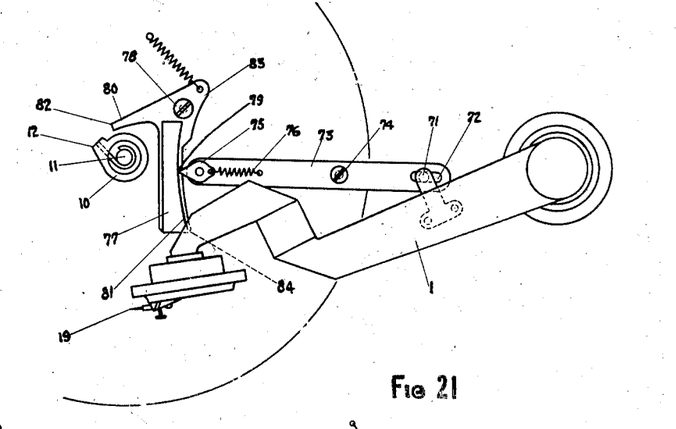
Figs. 21 to 23 show another convenient form of the invention.
Figure 22:
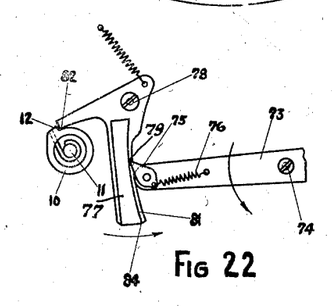
Figure 23:
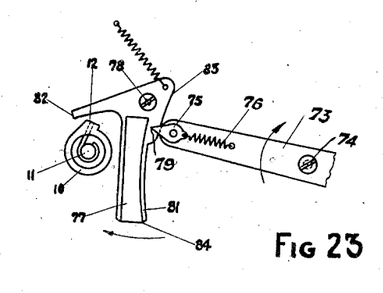

Figs. 21 to 23 illustrate another modification of the invention in which a lug 71 (corresponding to lugs 2, and 27 of the previous forms) on the tone arm operates in a slot 72 in the lever 73 which pivots about the pin 74 preferably on the motor board of the instrument. The lever 73 is provided with a second lever or pawl 75 pivoted thereon and held in definite relation thereto by a spring 76 or the like, provided no resistance is offered to its movement. The lever 75 is adapted to work in conjunction with a third lever or rocker 77 (pivoted at 78) which engages the cam projection 12 once every revolution of the turntable.

When playing a record, the lever 73 moves a definite distance for each revolution of the record. This in turn moves the pivoted lever 75 a proportional distance. The end of 75 is preferably formed with a knife edge 79 and normally lies in contact with and at right angles to the lever 77. The edge 79 of the pawl-shaped lever 75 is therefore dragged a proportional amount out of normal position relative to lever 73 during each revolution.

Once every revolution of the turntable or at any other suitable interval, the cam projection 12 engages the face 80 and moves the lever 77 momentarily away from the knife edge 79, so enabling the lever 75 to return under the influence of its spring 76 to its normal position relative to the lever 73.

The above action continues until the reproducer stylus 19 reaches the end of the sound groove and moves inwards more than a predetermined amount during one revolution of the turntable. The knife edge 79 is then retained by the quadrant surface 81 of the lever 77 so that the lever 75 rotates a considerable distance, about its pivot (as shown in Fig. 22), and permits the lever 77 to be moved about its pivot 78 and the end 82 to engage the projection 12 on the cam 10, and thereby stop the rotation of the turntable or actuate other control mechanism.

The levers 77 and 75 can be reset to play another record by movement of the tone arm 1 outwards so that the lever 73 occupies the position shown in Fig. 23 when the end of lever 73 engages the face 83 and permits the spring 76 to return the lever 75 to its normal position.

Mechanism as shown in Figs. 21 to 23 can also be operated by excessive backward movement of the tone arm in relation to its playing direction or, if required, the control mechanism can be actuated when the lever 75 reaches and slips over the end 84 of the lever 77.

Figure 24:
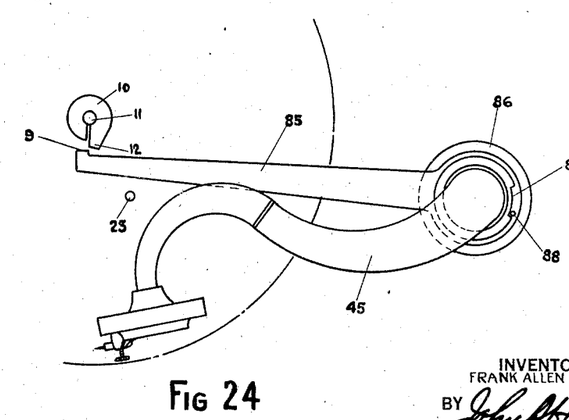
Fig. 24 is a further simplified form of the invention.

Fig. 24 shows a simplified form of brake or control device according to the invention, in which the three levers corresponding to 2, 3 and 5 of Fig. 1 are combined in one lever 85 which is in friction engagement with the tone arm 45 at 86, so that it moves inwards with the reproducer while playing a record and is intermittently replaced by the projection 12 on the cam 10. But when the reproducer moves inwards more than the predetermined amount, the end 9 catches the projection 12 and stops rotation of the turntable shaft 11.

When the tone arm 45 is moved outwards to re-start the mechanism the slot 87 engages the pin 88 and pulls the end 9 out of engagement with the cam projection 12 and permits the turntable shaft 11 to revolve.

It is desirable that one or more of the contacting faces between co-operating metal parts be insulated by means of leather, rubber, paper or other sound absorbing or friction material, and in some constructions we may form the cam 10, levers or other parts from fibre, vulcanite or other material, instead of metal.

If desired the cam or equivalent part 10 may be driven by some other part of the motor than the turntable shaft 11 or by a separate motor.

The control mechanism may function to actuate co-operating mechanism without stopping the record, by provision for example of a groove of coarse pitch between adjacent sound grooves of standard pitch.

The control mechanism may be constructed to operate with records working from the center outwards and, further to start the reproduction from a second record when used with talking picture apparatus, or any other desired use may be made of the control apparatus.

It must be understood that the foregoing details of construction are given by way of illustration and not of limitation. The mechanism may be reversed, multiplied or modified and co-operating parts may be interchanged or constructed in many different ways and used with any known record stopping, repeating, changing or like apparatus, without departing from the scope of the invention.

In this connection it is to be understood that for the purpose of the following claims or of this invention, that the terms "pick-up arm" and "tone arm" are synonymous and that both of said terms are included in either term and in the term "traveling element" and that the claims are to be read and understood accordingly.

Having now particularly described and ascertained the nature of my said invention and in what manner the same is to be performed, I declare that what I claim is:—

1. In a phonograph including a rotating element and a traveling element, a control means, a member movable by the traveling element through a predetermined distance during each revolution of the rotating element, means to intermittently move said means in the opposite direction, and means whereby the control means is operated when the member is moved more than the predetermined distance during a revolution of the rotating element.

2. In a phonograph including a rotating element and a traveling element, a control means, a member movable in one direction by the traveling element and through a predetermined distance during each revolution of the rotating element, means to intermittently move said member in the opposite direction, and means whereby the control means is operated when the member is moved more than the predetermined distance in the first direction during a revolution of the rotating element.

3. In a phonograph including a rotating element and a traveling element, a control means, a member movable by the traveling element through a predetermined distance in one direction for each revolution of the rotating element during the playing of a record, a part moved by the rotating element to replace said member, and said part having means whereby the control device is operated when the member is moved more than the predetermined distance during a revolution of the rotating element.

4. In a phonograph including a rotating element and a traveling element, a control means, said control means including a member movable in accordance with movement of the traveling element, a part rotatable in accordance with the rotation of the rotating element, said part operatively engaging said member during the playing of a record to move the member in a direction reverse to its direction of movement in accordance with movement of the traveling element, and said part and member adapted to co-act and become operative on the member being moved more than a predetermined distance for a given number of revolutions of the rotating element.

5. In a phonograph including a rotating element and a traveling element, a control means, said control means including a member movable in accordance with movement of the traveling element, a part rotatable in accordance with the rotation of the rotating element, a link means between the part and member and capable of transmitting movement from the part to the member, said part operatively engaging said link means during the playing of a record to move the member in a direction reverse to its direction of movement in accordance with movement of the traveling element, and said part and link means adapted to co-act and become operative on the member being moved more than a predetermined distance for a given number of revolutions of the rotating element.

6. In a phonograph including a rotating element and a traveling element, a control means, said control means including a member movable in accordance with movement of the traveling element, a cam rotatable in accordance with the rotation of the rotating element, said cam operatively engaging said member during the playing of a record to move the member in a direction reverse to its direction of movement in accordance with movement of the traveling element, and said cam having an abrupt surface to engage said member and co-act therewith to become operative on the member being moved more than a predetermined distance for a given number of revolutions of the rotating element.

7. The combination as in claim 6 including an actuating means between the cam and member and a spring to replace the actuating means when moved out of position by the cam.

8. The combination as in claim 3 wherein the member moved by the traveling element consists of an extension on the traveling element and wherein means are interposed between said member and the part, said interposed means including two frictionally engaging pivoting levers, said member engaging one of said levers, and said part adapted to engage the other during each revolution of the part while a record is being reproduced.

9. In a phonograph including a rotating element and a traveling element, a control means, a member movable by the traveling element, and said member adapted to actuate the control means when the traveling element moves in either direction at greater than a predetermined speed relative to the rotating element.

10. In a phonograph including a rotating element and a traveling element and a shaft on which the rotating element is mounted and by which it is rotated, a control means, said control means including a member movable by the traveling element through a predetermined distance for each revolution of the rotating element during the playing of a record, a cam on said shaft and operable to replace said member at each revolution of the shaft, and said cam having means whereby the control device is operated on the member being moved more than the predetermined distance during a revolution of rotating element.

11. In a phonograph including a rotating element and a traveling element and a shaft on which the rotating element is mounted and by which it is rotated, a stop means, said stop means including a member movable by the traveling element through a predetermined distance for each revolution of the rotating element during the playing of a record, a cam on said shaft and operable to replace said member at each revolution of the shaft when said member has been moved said predetermined distance, and said cam having a squared surface adapted to be engaged by said member to stop the rotating element on the member being moved more than the predetermined distance during a revolution of the rotating element.

Signed at London, England, this 16th day of April, A. D. 1930.

FRANK ALLEN MITCHELL.